April 12, 1966     R. L. HAWKS     3,245,172

WORM HOLDER AND DISPENSER

Filed Feb. 19, 1964

INVENTOR
Robert L. Hawks
by McDougall, Hersh & Scott
Att'ys

United States Patent Office 3,245,172
Patented Apr. 12, 1966

3,245,172
WORM HOLDER AND DISPENSER
Robert L. Hawks, Chicago, Ill., assignor to F & F Enterprises, Inc., Chicago, Ill., a corporation of Illinois
Filed Feb. 19, 1964, Ser. No. 348,895
12 Claims. (Cl. 43—55)

This invention relates to a worm holder and dispenser and it relates more particularly to a worm holder and dispenser from which worms can be made separately available for impaling upon the ends of a fishhook without the necessity for touching the worm with the human hand and without imparting human odor thereto.

Traditionally, a fisherman using worms for bait carries the worms in a carrier, either open or closed, in which a medium wherein the worm may burrow may or may not be placed. The customary fashion of baiting a hook necessitates the separating of an individual worm to be used from the several in the container as well as from the media wherein they may have burrowed. This is often accomplished by pouring the dirt and worms upon a surface for the removal of an individual worm after which the material is returned to the container. Thereafter, individually, the worm is skewered onto the fishhook by the fisherman holding the worm in one hand and the hook in the other thereby permitting odors to be imparted to the worm, odors which might drive away a fish which might otherwise take the bait.

It is an object of this invention to provide means for holding and dispensing worms whereby the fisherman has them available in a clean, odorless environment ready for baiting onto a fishhook without the need manually to separate individual worms from the remainder in the container or the media therein and without the necessity to handle the worms.

More specifically, it is an object of this invention to provide a holder and dispenser for worms from which worms can be dispensed individually ready for use as bait without being handled by the fisherman.

It is a specific object of this invention to provide a ventilated, covered container adapted to be carried by a fisherman designed to achieve the aforementioned objects.

These and other objects and advantages of this invention will hereinafter appear and for purposes of illustration, but not of limitation, an embodiment of the invention is shown in the accompanying drawing, in which—

Figure 1:
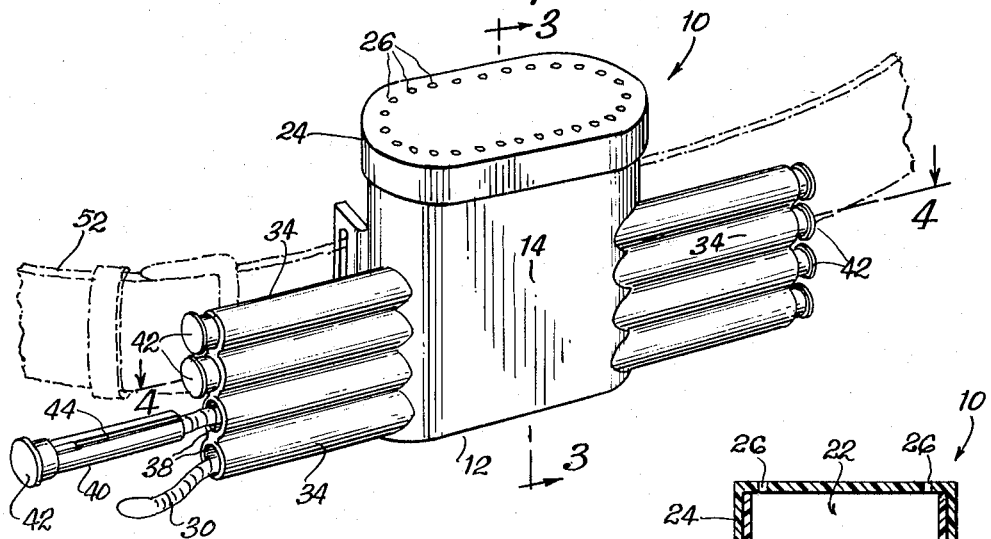
FIG. 1 is a perspective elevational view of a worm holder and dispenser embodying the features of this invention.

Briefly described, the worm holder and dispenser of this invention embodies a central ventilated enclosure having a volumetric capacity sufficient to hold a number of worms and bedding material in which the worms can burrow and derive food and moisture for maintaining an active, clean life over an extended period of time. Radiating outwardly from the enclosure is at least one and preferably a plurality of tubular members having a bore dimensioned comfortably to receive one normally sized worm and received in telescoping relationship within the tubular member is a sleeve which is open at its inner end for direct communication with the enclosure and which is closed at its outer end to block the passage of worms therethrough. The sleeve is provided with an elongate slot extending axially in its periphery from the inner end through the major portion of its length to enable passage of a shank of a fishhook therethrough for bayoneting the worm while retained within the sleeve upon removal from the tubular member.

Referring now to the drawing for a detailed description of a preferred embodiment of the holder-dispenser for worms, the numeral 10 indicates a container having a bottom wall 12, upright front and back walls 14 and 16 and curvilinear side walls 18 and 20 which together define an upright enclosure which is open at the top 22.

A cover 24 is adapted to be received in fitting relationship on the open top to seal the enclosure and the cover is provided with a plurality of vent openings 26 which enable the passage of air therethrough and to ventilate the interior of the container. It will be understood that the container may be formed to other shapes in cross-section, such as square, rectangular, oval, hexagonal, circular, and the like shapes, but with sufficient capacity to hold a number of worms 30 and bedding 32 in which the worms may burrow and from which the worms may derive nourishment and moisture. Instead of providing the vent openings in the cover 24, vents may be provided in one or more of the vertical walls of the container.

Tubular members 34 extend integrally outwardly substantially horizontally from the lower portions of the vertical walls of the container with the bore 35 being open at opposite ends for direct communication at their inner end 36 with the interior of the container and with their outer ends 38 being open to the atmosphere. Each tubular member is provided with an elongate hollow sleeve member dimensioned to have a length corresponding somewhat to that of the tubular member and shaped to correspond with the bore of the tubular member and dimensioned to be received therein in fitting relationship whereby the sleeve member can be axially linearly displaced into and out of the tubular member from the open end 38. The sleeve member 40 is provided at one end with a closure in the form of a cap 42 which is of larger dimension than the remainder and of larger dimension than the bore 35 of the tubular member so as to enable insertion of the sleeve into the tubular member until the cap portion of larger dimension is engaged. Such sleeve is also provided with a slot 44 which extends continuously from the inner edge through the major length of the sleeve but terminating short of the head portion of larger dimension with the slot being dimensioned to have a width slightly greater than the cross-sectional dimension of a fishhook to enable the hook to be displaced lengthwise through the slot with the hook end in the bore of the sleeve to bayonet a worm onto the end thereof, as illustrated in FIG. 2.

It will be understood that the container can be provided with more than one tubular member and sleeve combination, as illustrated by the four tubular members vertically aligned to extend laterally from one side and another pair of four vertically aligned tubular members to extend laterally from the other side. Such tubular members may also be arranged in side-by-side relationship as well as in the illustrated vertically stacked relationship and they may also extend outwardly from the front wall as well as, or in addition to, the tubular members extending outwardly from the side walls. By way of further modification, the tubular members and sleeves may be formed to other shapes than round, such as square, rectangular, oval and the like, in cross-section.

Figure 2:
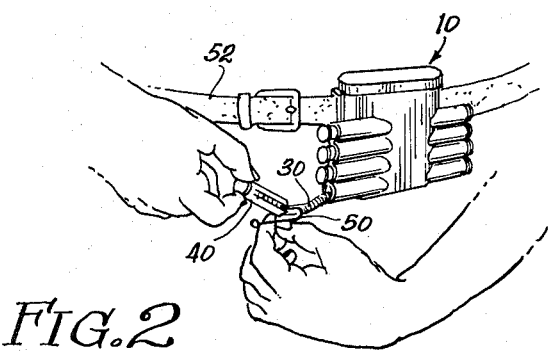
FIG. 2 is a perspective view similar to that of FIG. 1 illustrating the use of the device in the removal of a separated worm and the placement thereof onto the end of a fishhook.
Figure 3:
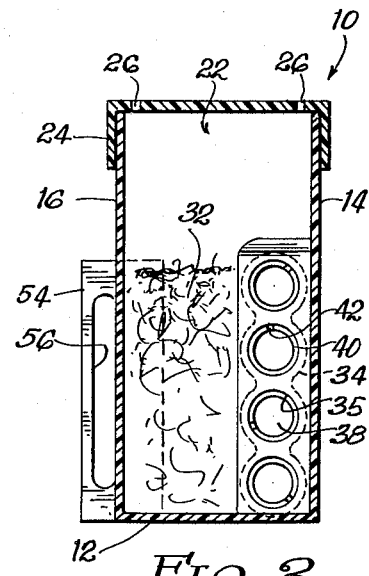
FIG. 3 is a sectional view taken vertically along the line 3—3 of FIG. 1.
Figure 4:
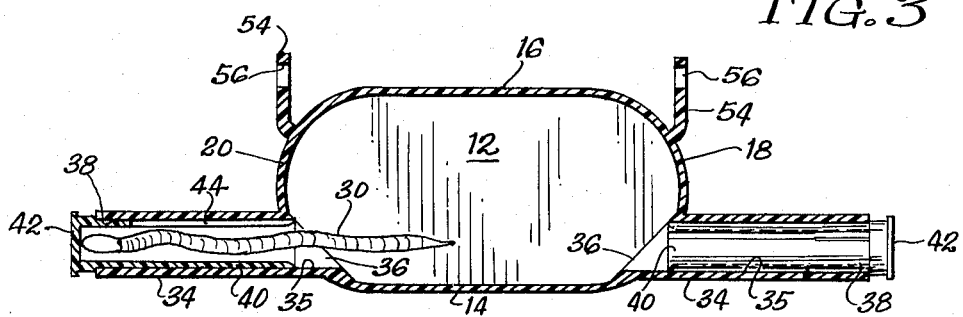
FIG. 4 is a sectional view taken horizontally along the line 4—4 of FIG. 1.

The bore of the sleeve member should be dimensioned to be slightly greater in cross-section than that of a conventionally grown worm or night crawler so as to enable a worm to be received in the bore of the concentrically arranged tube and sleeve members when the latter are telescoped one within the other so that a substantial length of the worm 30 will reside in the bore of the sleeve to be retained therein when the sleeve is displaced from within the tubular member, as shown in FIG. 2.

The elements described can be formed of various structural materials but it is preferred to form the container portion of a molded plastic material having some degree of translucency for the passage of light into the interior of the container whereby the worms, which will have a tendency to seek darkness, will voluntarily crawl into the tubular members where greater darkness can exit because of the greater wall thickness, or because of the double thickness of tubular member and sleeve when similarly formed of plastic material or when one or the other of the tubular members or sleeve members are formed of non-translucent material such as metal, wood and the like.

In the use of the device of this invention for the storage and dispensing of fishing worms, the worms are placed into the container portion 10 in order to preserve the worms for an extended period of time. It is preferable also to include in the container media or bedding into which the worms may burrow and from which the worms may obtain food and moisture.

By reason of the natural conditions existing, one or more worms will crawl into the bore of the tubular member and sleeve whereby, upon removal of the sleeve, as illustrated in FIG. 2, the body portion of the worm extending into the sleeve will become exposed.

Baiting a fishhook without the necessity of touching the worm can be accomplished by inserting the point of the hook 50 into the slot 44 and skewering the worm onto the hook. The hook may then be displaced endwise from the slot with the worm bayoneted onto the end thereof and ready for use as bait.

In the illustrated modification, means are provided for mounting the worm holder and dispenser onto a belt 52. For this purpose, the back wall 16 of the container is provided with a pair of laterally spaced apart, vertically disposed flanges 54 having crosswise aligned, vertically disposed slots 56 through which a belt may be threaded thereby removably to secure the device in position of use on the belt.

Figure 5:
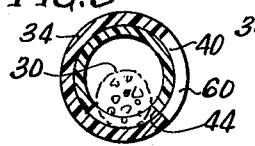
FIG. 5 is a sectional view through one of the turrets showing a modification in the construction with the elements in their sealed relation.
Figure 6:
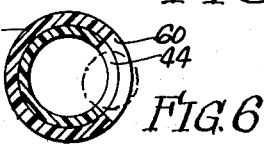
FIG. 6 is a sectional view corresponding to that of FIG. 5 showing the arrangement of elements in their open position.

By way of modification, as illustrated in FIGS. 5 and 6, the tubular member 34 can be formed with an elongate slot 60 preferably having a width slightly greater than the cross-section of the worm 30 and a length which corresponds substantially to the slotted portion 44 of the sleeve 40 which is received in telescoping relationship therein and preferably extending substantially continuously throughout its length to the outer end.

In this arrangement, both the tubular member and the sleeve are of rounded shape so as to enable the sleeve rotatably to be mounted within the tubular member and the slot 44 in the sleeve is also dimensioned to have a width slightly greater than the cross-section of the worm 30. In this arrangement, it is unnecessary to effect displacement of the sleeve endwise relative to the tubular member for the purpose of separating the sleeve therefrom to expose the worm contained therein. Instead, the sleeve can be located within the tubular member to offset the slot 44 from the tubular slot 60 and thereby effect a sealing relationship between the elements substantially corresponding to the previous construction and to provide a sealed dark bore in which the worm can find refuge. When it is desired to gain access to the interior for removal or for impaling the worm onto the end of a fishhook, it is only necessary to rotate the sleeve within the tubular member until the sleeve slot 44 is aligned or contiguous with the slot 60 of the tubular member to provide a continuous opening into the interior of the sleeve for access to the worm that will be housed therein. In this construction, where the tubular members are separately arranged or laterally spaced apart, the preferred location of the slot 60 would be in the top wall. In the construction where the tubular members are stacked one on the other, as in FIGS. 1–4, the preferred arrangement would be to provide the slot 60 either in the side walls or in the upper side walls.

It will be apparent also that the concepts described can be obtained when the tubular member is adapted to be received in telescoping relationship within the sleeve but, in such event, the bore of the tubular member will hold the worm while the outer sleeve is rotated to align the slots in open position or to offset the slots in closed position.

It will be apparent from the foregoing description that I have provided a new and simple worm holder and dispenser wherein a plurality of worms may be stored over an extended period of time and from which individual worms may be removed in a manner to expose the worm for baiting a hook without the necessity of touching the worm to impart human odor thereto. The device described also enables a hook to be baited with the worm by those who are squeamish or otherwise find it objectionable to handle worms.

It will be understood that numerous changes may be made in the details of construction, arrangement and operation, without departing from the spirit of the invention, especially as defined in the following claims.

I claim:

1. A worm holder-dispenser comprising an enclosure having a capacity for holding a number of worms and having an outer wall, elongate passages in communication with the interior of the enclosure and extending outwardly from said wall, and hollow sleeve members open at one end and closed at the other and with the open end thereof providing the communication with said interior, said sleeve members being dimensioned to be received within the passages in telescoping relationship with the closed end outwardly of the passages to effect closure thereof, the open ends of said hollow sleeve members permitting said worms to crawl into said sleeve members with said sleeve members being movable outwardly relative to said passages to permit removal of worms from said sleeve members.

2. A worm holder-dispenser as claimed in claim 1 in which the sleeve members are received in fitting relationship within the passages for endwise sliding movement into and out of the passages.

3. A worm holder-dispenser as claimed in claim 1 in which the sleeve members are formed with an elongate slot through the wall thereof from the open end through the major portion of the length of the sleeve received in telescoping relationship within the passages whereby access to the interior of said sleeve members is provided for removal of worms.

4. A worm holder-dispenser as claimed in claim 1 in which the enclosure is open at the top and which includes a cover received in fitting relationship over the end to close the open end.

5. A worm holder-dispenser as claimed in claim 4 in which the enclosure and cover have openings through one of the members for ventilation of the interior of the enclosure.

6. A worm holder-dispenser as claimed in claim 1 which includes means for mounting the enclosure on a belt.

7. A worm holder-dispenser as claimed in claim 6, in which the mounting means comprises a pair of laterally spaced apart flanges extending in spaced parallel relationship from an upright wall of the enclosure and having crosswise aligned vertical slots therethrough for threading onto a belt.

8. A worm holder-dispenser as claimed in claim 1 in which the elongate passages extending horizontally form a lower part of the enclosure.

9. A worm holder and dispenser comprising an enclosure having a capacity for holding a number of worms, an elongate hollow tubular member extending outwardly from the enclose having a bore open at its inner end for direct communication with the interior of the enclosure, an elongate slot axially arranged in the periphery of the tubular member dimensioned to have a width greater than the cross-sectional dimension of a worm, and an elongate hollow cylindrical sleeve member adapted to be received in telescoping relationship with the tubular member and dimensioned to have a bore greater than the cross-sectional dimension of a worm and a slot axially arranged through the periphery of the sleeve member dimensioned to have a width similar to that of the slot in the tubular member whereby the slots are out of registry one with the other when the sleeve is rotated to one position thereby to seal the interior of the sleeve bore and whereby the slots are in registry one with the other when the sleeve is rotated to open position thereby to expose the interior of the sleeve bore for access to any worms housed within the tubular member.

10. A worm holder and dispenser as claimed in claim 9 in which the slots are dimensioned to have a width of about ¼ to ½ inch and in which the bore of said sleeve is dimensioned to have a width of ¼ to ½ inch.

11. A worm holder and dispenser as claimed in claim 9 in which the sleeve is received in telescoping relationship within the tubular member.

12. A worm holder and dispenser as claimed in claim 9 in which the tubular member and sleeve are elongate members and in which the tubular member is received in telescoping relationship within the sleeve.

References Cited by the Examiner

UNITED STATES PATENTS

| | | | |
|---|---|---|---|
| 1,140,625 | 5/1915 | Spitzler | 43—55 |
| 1,222,847 | 4/1917 | Carpenter et al. | 215—47 X |
| 1,626,312 | 4/1927 | Tipton. | |
| 2,039,205 | 4/1936 | Anderl. | |

FOREIGN PATENTS

| | | |
|---|---|---|
| 26,340 | 3/1881 | Germany. |
| 572,108 | 1/1958 | Italy. |

SAMUEL KOREN, *Primary Examiner.*

ABRAHAM G. STONE, *Examiner.*